United States Patent [19]
Milillo

[11] Patent Number: 5,794,176
[45] Date of Patent: Aug. 11, 1998

[54] ADAPTIVE ELECTRONIC REGISTRATION SYSTEM

[75] Inventor: William D. Milillo, Ontario, N.Y.

[73] Assignee: Xerox Corporation, Stamford, Conn.

[21] Appl. No.: 719,239

[22] Filed: Sep. 24, 1996

[51] Int. Cl.[6] .................................................. G01B 7/00
[52] U.S. Cl. .......................... 702/150; 399/395; 271/228
[58] Field of Search .................... 364/559–562, 364/565, 566, 571.01, 148, 752, 167.01, 174, 176; 271/3.14–3.17, 226–229, 236, 239, 265.01, 265.02, 265.03; 399/394, 395, 396

[56] References Cited

U.S. PATENT DOCUMENTS

| | | |
|---|---|---|
| 4,511,242 | 4/1985 | Ashbee et al. ........................ 271/227 |
| 5,078,384 | 1/1992 | Moore ................................... 271/228 |
| 5,094,442 | 3/1992 | Kamprath et al. .................... 271/237 |
| 5,156,391 | 10/1992 | Roller .................................. 271/227 |
| 5,169,140 | 12/1992 | Wenthe, Jr. .......................... 271/228 |
| 5,219,159 | 6/1993 | Malachowski et al. ............... 271/228 |
| 5,697,608 | 12/1997 | Castelli et al. ....................... 271/228 |

*Primary Examiner*—James P. Trammell
*Attorney, Agent, or Firm*—Michelle W. Waites

[57] ABSTRACT

A method and apparatus for positioning paper in a feed path by providing continuous feedback of copy sheet registration parameters is disclosed. More specifically, the present invention is directed to a system which compares measured sheet registration information with an ideal value stored in a microprocessor. These measured registration parameters are averaged and pertinent information is fed back to the control system of the copy sheet registration device. The information that has been fed back is then used to adjust the orientation of subsequent copy sheets, thereby allowing for ideal placement of the copy sheet onto the photoreceptor for successful transfer of a developed image.

17 Claims, 5 Drawing Sheets

| Longitudinal | 120 | 122 | 124 |
|---|---|---|---|
| Skew | 126 | 128 | 130 |

ADAPTIVE ELECTRONIC REGISTRATION SYSTEM

The present invention is directed to a method and apparatus for positioning paper in a feed path.

More specifically, the present invention is directed to a system which feeds information about the configuration of a copy sheet back to the control system of a registration device, thereby enabling continuous sheet positioning optimization of the subsequent sheets.

BACKGROUND OF THE INVENTION

The xerographic imaging process begins by charging a photoconductive member to a uniform potential, and then exposing a light image of an original document onto the surface of the photoconductor, either directly or via a digital image driven laser. Exposing the charged photoconductor to light selectively discharges areas of the surface while allowing other areas to remain unchanged, thereby producing an electrostatic latent image of the document on the surface of the photoconductive member. A developer material is then brought into contact with the surface of the photoconductor to transform the latent image into a visible reproduction. The developer may include toner particles with an electrical polarity opposite that of the photoconductive member. Thus, the toner particles are naturally drawn to the oppositely charged photoreceptor. A blank copy sheet is brought into contact with the photoreceptor and the toner particles are transferred thereto by electrostatic charging the sheet. The sheet is subsequently heated, thereby permanently affixing the reproduced image to the sheet. This results in a "hard copy" reproduction of the document or image. The photoconductive member is then cleaned to remove any charge and/or residual developing material from its surface to prepare it for subsequent imaging cycles.

Blank copy sheets of a variety of sizes are typically stored in trays that are mounted at the side of the machine. In order to duplicate a document, a sheet having the appropriate dimensions is transported from the tray into the paper path just ahead of the photoreceptor. The copy sheet is then brought in contact with the toner image that is present on the surface of the photoreceptor prior to transfer. If the copy sheet has not been oriented or registered properly before it is brought in contact with the toner image, the toner image may be fused at an improper location on the copy sheet, causing it to be skewed or too far up or down on the page.

Conventional sheet aligning mechanisms for equipment using paper feed stocks, such as electrophotographic reproduction equipment, use crossed nip rollers in conjunction with fixed guides and gates for positioning paper. Such systems commonly use sheet driving rolls which push the sheets against such guides and gates. These conventional systems have many drawbacks. If the sheets contact the guide and gate surfaces with excessive force, the edges of the sheets can be bent or crumpled. This condition occurs especially with lightweight papers and causes problems in downstream feeding of the paper. Thus, each system must be carefully set up for a narrow range of paper weight to provide sufficient drive force for movement of the sheet without damaging the sheet as it is driven against a guide or gate. In addition, undesirable dust is formed as a result of the impact and sliding of the paper against the hard guide surfaces. Further, duplex copying requires an additional station to shift the sheet laterally before it is returned to the cross roll feeder for re-feeding, so that the sheet can be realigned by the cross roll feeder against the guide. In addition, such systems are prone to drive roll slippage which can cause mis-registration and smearing.

A translating electronic registration (TELER) system is a method of registering copy paper or documents. It generally includes three optical sensors, a pair of coaxial independently driven drive rolls, a carriage with a linear drive on which paper drive rolls are mounted, and a microprocessor controller. A blank copy sheet is driven into the nip rolls and moved through the paper path for placement and fusing of an image thereon. The speed of both nip rolls can be controlled to effect skew alignment and longitudinal registration. The nip rollers are mounted on a carriage movable transversely with respect to the feed path. A sensor system controls positioning of the carriage to achieve the desired top edge or a lateral positioning of the sheet. Independent control of nip roll drive and carriage translation provides simultaneous alignment in lateral and longitudinal directions. A translational electronic registration system of this type is disclosed in U.S. Pat. No. 5,094,442 to Kamprath et al. issued Mar. 10, 1992 whose contents are hereby incorporated by reference.

The following disclosures may also be relevant to various aspects of the present invention:

U.S. Pat. No. 5,219,159 to Malachowski et al. issued Jun. 15, 1993 discloses an apparatus to bilaterally register and deskew sheets in an electrophotographic printing machine by driving the sheet against a pair of stalled drive rolls and then activating the drive rolls when the sheet is deskewed. A stepper motor is used to translate the roll pairs in a lateral direction and the pulse counts are utilized to store the side registration and sheet acquisition positions thereby eliminating the need for a home position sensor or switch.

U.S. Pat. No. 5,169,140 to Wenthe issued Dec. 8, 1992 discloses a method and apparatus for deskewing and side registering a sheet. A sheet is first driven non-differentially in a process direction with a sheet driver, and the angle of skew is measured with an initial skew sensing mechanism. The sheet is then driven differentially with a sheet driver to compensate for the magnitude of side-to-side mis-registration, thereby inducing a registration angle of skew. The method also includes determining an absolute angle of skew, and driving the sheet differentially with the sheet driver to compensate for he absolute angle of skew so that the sheet is deskewed and one edge of the sheet is side registered. An apparatus for carrying out the method is also disclosed.

U.S. Pat. No. 5,156,391 to Roller issued Oct. 20, 1992 discloses a method and apparatus in which copy sheets in a short paper path in an electrophotographic printing machine may be deskewed by differentially driving two sets of rolls so as to create a paper buckle buffer zone in the sheet and then differentially driving a roll set to correct the skew while the sheet is still within the nips of multiple drive roll sets. Leasing edge damage to sheets is eliminated as the deskewing rolls are initially traveling at the same velocity as the sheet.

U.S. Pat. No. 5,078,384 to Moore issued Jan. 7, 1992 discloses a method and apparatus for deskewing and registering a copy sheet, including the use of two or more selectably controllable drive rolls operating in conjunction with sheet skew and lead edge sensors, for frictionally driving and deskewing sheets having variable lengths. The sheets are then advanced to reach a pre-defined registration position at a predetermined velocity and time, at which point said sheets will no longer be frictionally engaged by said drive rolls.

All of the references cited herein are incorporated by reference for their teachings.

Accordingly, although known apparatus and processes are suitable for their intended purposes, a need remains for a method and apparatus capable of compensating for system errors which occur during real time processing especially, those that occur in devices which utilize high speed, short paper paths.

SUMMARY OF THE INVENTION

In accordance with the present invention, there is provided a method of continuously positioning copy media in a feed path, which includes feeding the copy media into the feed path; using motion control algorithms to correct an orientation of the copy media for placement on a target in a pre-determined configuration; collecting data, in terms of a longitudinal component and a skew component, which describes a correction required to place the copy media in said pre-determined configuration; transmitting said data to a central processing controller, and storing it in locations in a computer memory; separately calculating average values for longitudinal and skew correction data from values stored in a plurality of computer memory locations; implementing said correction data by altering said motion control algorithms with said longitudinal and skew correction averages; and positioning subsequent copy media using said altered motion control algorithms.

In accordance with another aspect of the invention, there is provided an apparatus for continuously positioning copy media in a feed path, which includes a paper tray for storing the copy media, and for advancing the copy media to the feed path; an electronic drive roll system defining a nip, said electronic drive roll system located at an end of the feed path to orient sheets for proper placement onto a target; a correcting device communicating with said electronic drive roll system to adjust an orientation of the copy media if it has become mis-aligned; a measuring device to determine a motion profile required to eliminate misalignment of the copy media; a feedback system communicating with said electronic drive roll system and with said correcting device, to alter an orientation of the copy media as it enters said nip, thereby reducing misalignment of the copy media as it exits said nip; and a media transport system to move the copy media from said paper tray, along the feed path, to said electronic drive roll system, and to advance the copy media through said nip.

In accordance with still another aspect of the invention, there is provided an apparatus for continuously positioning copy media in a feed path, which includes means for feeding the copy media into the feed path; means for correcting an orientation of the copy media for placement on a target in a pre-determined configuration; means for collecting data, in terms of a longitudinal component and a skew component, which describes said correction required for placement of the copy media in said pre-determined configuration; means for transmitting said data to a processing controller, and storing it in a computer memory; means for separately calculating average values for longitudinal and skew correction data from values stored in computer memory; means for implementing said data by altering said correcting means with said longitudinal and skew correction averages; and means for positioning subsequent copy media using said altered correction means.

The present invention has significant advantages over current methods of aligning copy media in a feed path. First, in any registration system that utilizes drive rolls, the rolls typically experience deformations due to normal and drag forces that are applied at the drive roll nip. These deformations, which may vary from drive roll to drive roll, will produce sheet velocity variations which result in significant sheet registration error. The present invention provides continuous feedback to the printing system about the status of the movement of copy media through the paper path towards the photoreceptor and enables adjustments of subsequent sheets to continuously optimize registration performance thereby compensating for these effects.

Also, as printing machines operate over an extended period of time, the drive rolls, and many other moving parts within the machine, will begin to wear. The present invention will make internal adjustments to continue efficient movement of copy media from the paper trays through the feed path and into proper contact with the developed image on the photoreceptor. This will allow the printing machine in which the present invention has been included to continue successful operation over an extended period of time.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method and apparatus for positioning paper in a feed path. Specifically the present invention relates to a method and apparatus for providing continuous feedback to a controller to cause copy sheets to be oriented properly as they move through a xerographic printing machine.

Figure 1:
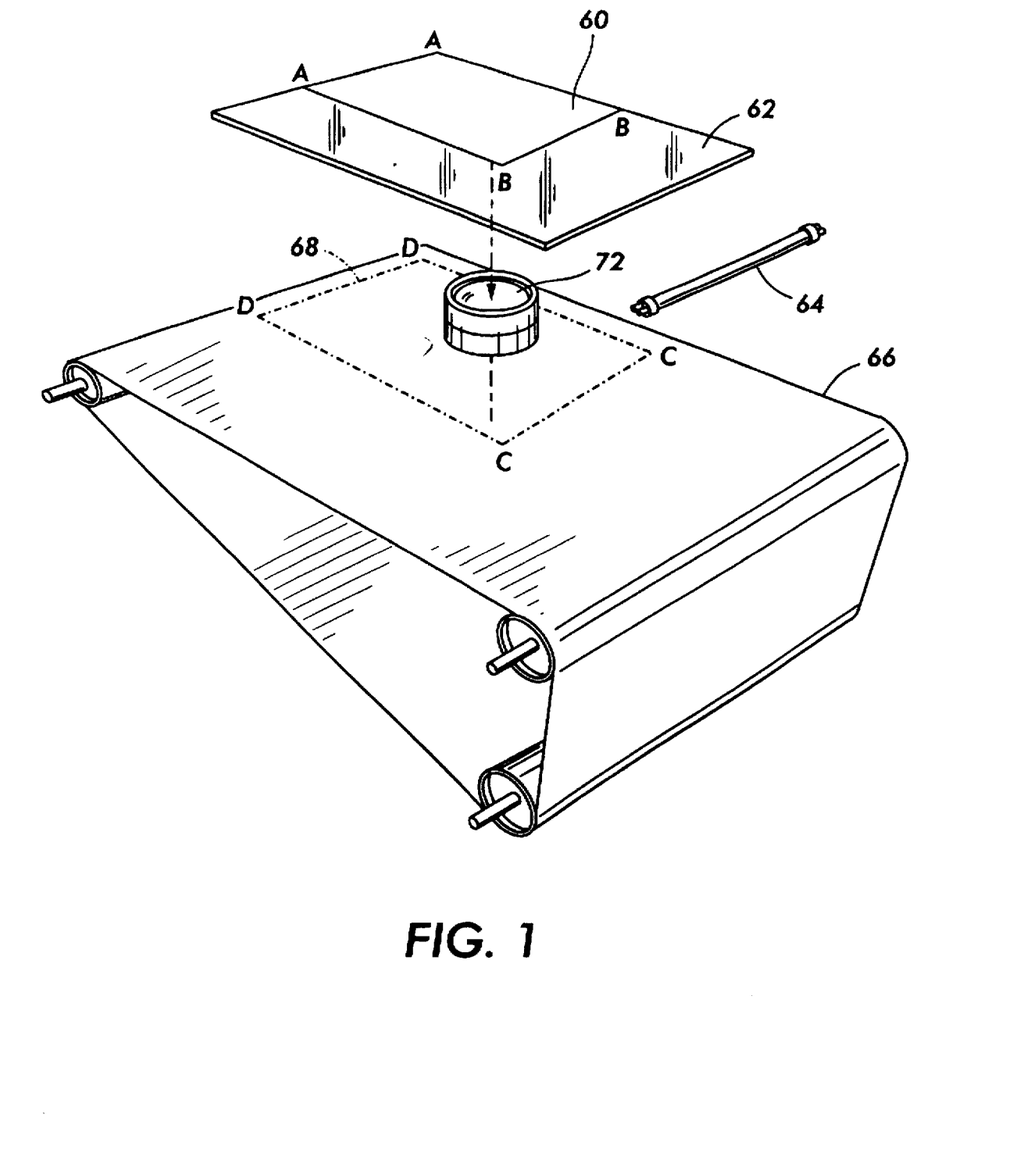
FIG. 1 depicts an isometric view of a possible layout of the interior of a xerographic copy machine. Relative positions of the platen glass, document, light source, lens, and photoreceptor are shown.

Referring now to the drawings where the showings are for the purpose of describing an embodiment of the invention and not for limiting same, FIG. 1 is used to illustrate an example light lens copying operation which begins by placing the document 60 face down upon the platen glass 62, such that the right edge of the original image is lined up with axis A. Axis B corresponds to the location at which the left edge of document 60 comes in contact with platen glass 62. It should be noted that the left edge of the image will rest at locations further away from or closer to axis A to axes B', B", etc. as documents with differing widths are used.

With continued reference to FIG. 1, document 60 is exposed to a light source 64, which causes the image thereon to be reflected back toward the copy machine and onto photoreceptor 66. Passage of the light reflected from document 60 through lens 72 causes latent image 68 projected onto photoreceptor 66 to be reversed such that the left edge of document 60 at axis A will be reflected at axis C on the photoreceptor belt. Thus, the left edge axis A of document 60 will become the trailing edge axis B of latent image 68, and will remain so throughout processing.

Figure 2:
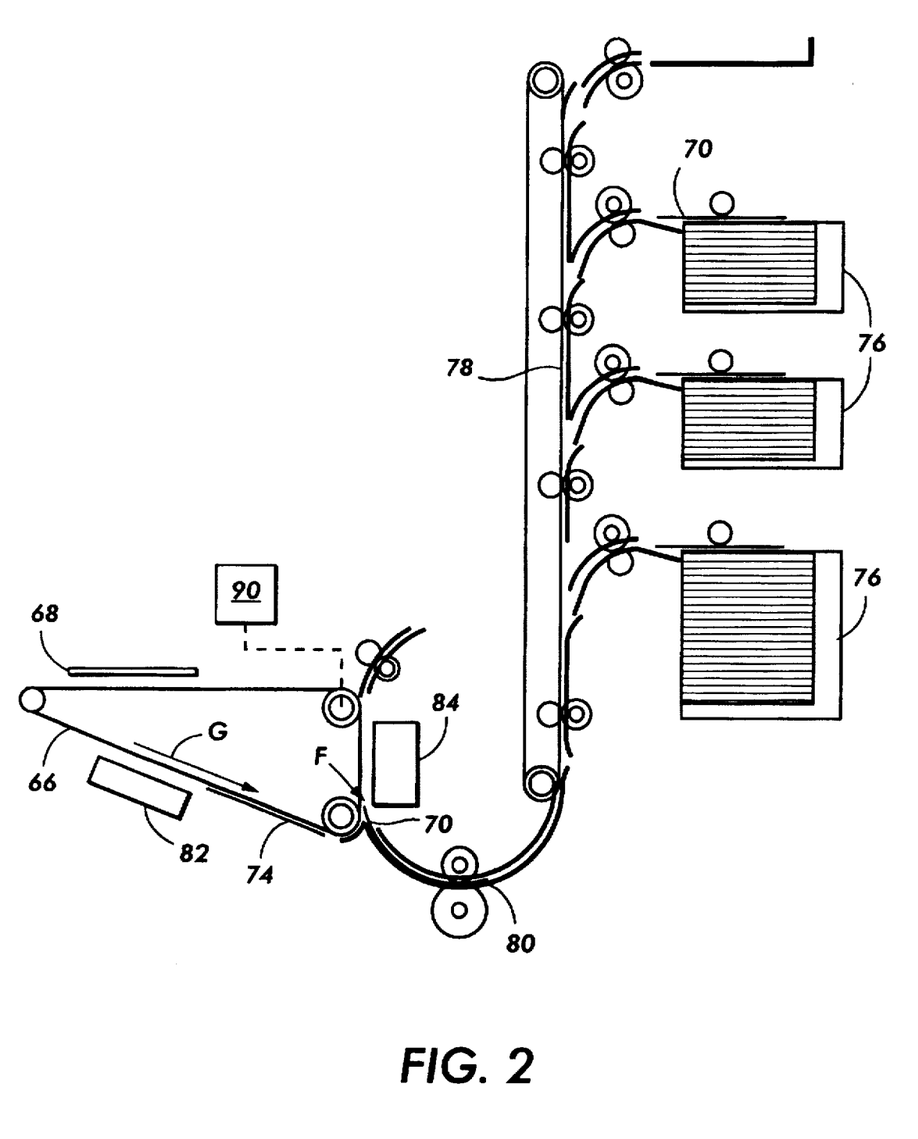
FIG. 2 shows an elevation view of an interior cavity of a photocopy machine. A photoreceptor is shown with latent and developed images shown thereon. The relative positions of the development, transfer, and fusing stations are also shown. The paper path and media storage trays are also shown.

As shown in FIG. 2, once the latent image is generated, photoreceptor 66 will move latent image 68 in the direction of arrow G. Toner particles are deposited onto it at development station 82, thereby transforming latent image 68 into a developed image 74. Photoreceptor 66 and developed image 74 will then proceed toward transfer station 84.

Before developed image 74 reaches transfer station 84, a blank copy sheet 70 will be removed from one of paper trays 76 and transported along paper path 78. Copy sheet 70 will pass through nip 80 between the two rolls at the end of paper path 78 to be placed in contact with developed image 74 just as it reaches transfer station 84. Copy sheet 70 with developed image 74 thereon will then move through a pre-fuser transport 86 to fusing station 88 where the toner image will be permanently affixed to copy sheet 70.

The present invention provides a means for ensuring that copy sheet 70 is in proper alignment at the time it reaches transfer station 84. The invention may successfully be used with any electronic drive roll system. For example U.S. Pat. No. 5,278,624 to Kamprath et al. issued Jan. 11, 1994, the contents of which are completely incorporated by reference, discloses a differential drive registration system for copy sheets which uses a pair of drive rolls and a drive system for commonly driving both drive rolls. A differential drive mechanism is provided for changing the relative angular position of one of the rolls with respect to the other roll to deskew the copy sheet. A control system is supplied with inputs representative of the skew of the copy sheet and controls the differential drive mechanism to deskew the copy sheet. U.S. Pat. No. 5,090,683 to Kamath issued Feb. 25, 1992, the contents of which are completely incorporated by reference, discloses a device for selectively turning documents. First and second drive rollers are aligned along an axis transverse to a process direction in which documents are fed. First and second follower rollers are aligned with the first and second drive rollers. One drive roller is operated at a substantially constant peripheral velocity by constant velocity drive motor while the other drive roller is operated at a variable peripheral velocity by a variable speed drive so that the document is turned. The variable speed drive is driven through a variable velocity profile to control the amount of rotation of the document. A pair of sensors is placed adjacent to the drive rollers so the skew of the document can be measured prior to being rotated and can be used to determine the velocity profile for controlling the variable speed motor. After the document is rotated, the same two sensors are used to detect the skew, if any, of the trailing edge of the turned document for correction of the velocity profile used to rotate subsequent documents. An additional mechanism can be provided for shifting the connection of the constant velocity and variable speed motors between the first and second drive rollers so that a sheet can be rotated in opposite directions.

Copy sheets 70 typically pass through one or more sets of drive rolls in order to be placed in contact with photoreceptor 66. Very generally speaking, electronic drive roll systems require the use of electrical signals to control the speed of motors which are attached to these drive rolls. Thus, electrical signals are used to control the rotational velocity of the drive rolls.

As indicated above, there are numerous types of electronic drive rolls systems. One such electronic drive roll system is a translating electronic registration (TELER) system. The TELER system provides a very accurate method of correcting misalignment of sheets using speed controlled drive rolls to correct for skew mis-positioning and longitudinal registration. The system achieves proper lateral copy sheet registration through use of a translating carriage. Again, the TELER system is not the only electronic drive roll system that will exhibit enhanced performance when used with the present invention, and the invention is not limited to this embodiment.

Figure 3:
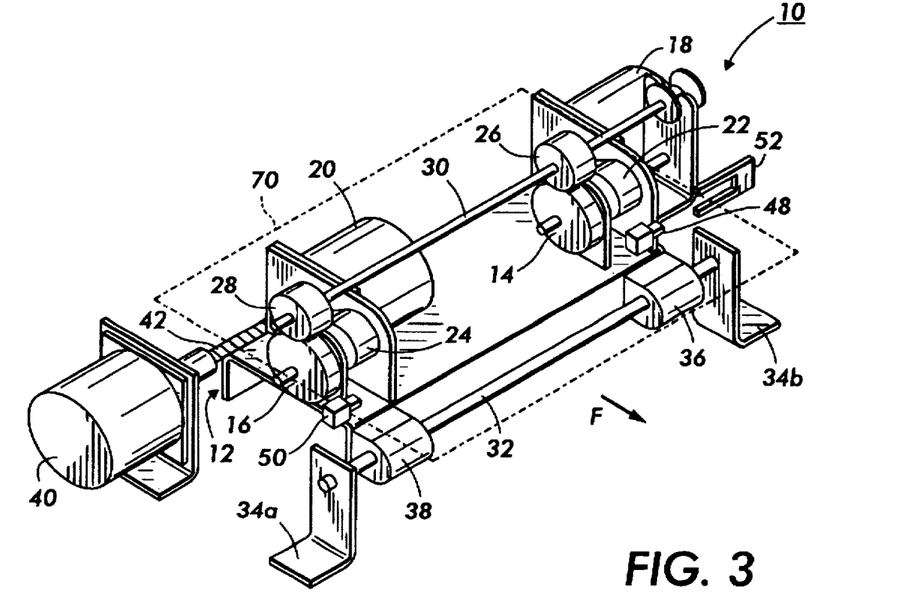
FIG. 3 is an isometric view of one type of translating electronic registration system whose performance will be greatly enhanced by implementation of the present invention.

One embodiment of an electronic drive roll system is illustrated in FIG. 3. The illustration shows a TELER system such as the one described above. Again, this invention is not limited to use with a TELER system, but for discussion purposes this system will used to describe operation of the present invention. A TELER registration unit 10 will typically be placed near the end of paper path 78 such that roll pairs 14 and 26 and 16 and 28 form nip 80 through which copy sheet 70 will pass just prior to reaching transfer station 84. A copy sheet 70 is moved into proper alignment or registration for downstream processing as the sheet travels in the direction shown by arrow F. The registration unit 10 includes a carriage 12 having two drive rolls 14 and 16 which are mounted thereon in rotatable fashion. The drive rolls 14 and 16 are driven by drive motors 18 and 20, respectively. The drive motors 18 and 20 are preferably speed controllable stepper motors, although other types of speed controllable servo motors are usable. The rotary output of each motor 18, 20 is transmitted to the respective drive roll 14, 16 by suitable power transmission means, such as belts 22, 24.

An idler roll 26 is rotatably mounted above drive roll 14. A similar idler roll 28 is mounted above drive roll 16. In a preferred embodiment, the idler rolls 26 and 28 are commonly coaxially mounted for rotation about the axis of a cross shaft 30, which is mounted on the carriage 12. The roll pairs 14, 26 and 16, 28 engage copy sheet 70 and drive it through registration unit 10. Carriage 12 is mounted for movement transverse to the process direction. The process direction is also referred to as the longitudinal direction and is indicated by arrow F. Transverse motion of carriage 12 is accomplished by mounting one edge of the carriage to the guide 32, which extends perpendicularly to the direction of sheet feed. The guide 32 is supported on the frame on which the registration system is mounted by a pair of opposed supports 34a and 34b. The carriage 12 is mounted on the guide 32 by a pair of bearings 36 and 38, which slide onto the guide 32.

Figure 4:
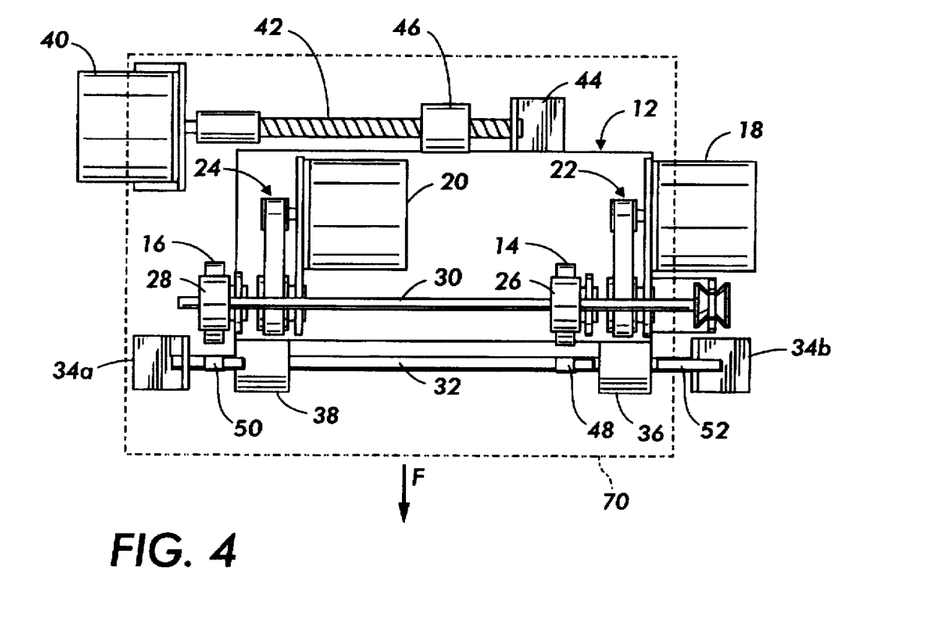
FIG. 4 is a plan view of the translating electronic registration system depicted in FIG. 3.

Referring now to FIG. 4, the carriage 12 is moved by a drive system including a speed controllable stepper motor 40 or other similar speed controllable servo motor. The output shaft of the motor 40 drives a lead screw 42 which is rotatably supported at the end opposite the motor by a suitable bearing support 44. The motor 40 and support 44 are mounted on the frame of the equipment in which the registration system is used. A block 46 having an internally threaded bore is mounted on the carriage. The threads of the internal bore of the block 46 engage the threads of the lead screw and it will be readily appreciated that as the motor 40 rotates the lead screw 42, the carriage will be driven transversely as the block 42 travels along lead screw 42. The direction of rotation of motor 40 governs the direction of movement of the carriage 12.

With continued reference to FIG. 4 the TELER electronic drive roll system includes sensors for detecting the relative position of the sheet. Preferably, the sensors are optical sensors which will detect the presence of edges of copy sheet 70. For lead edge detection of the sheet, two sensors 48 and 50 are mounted on the carriage 12 adjacent the drive rolls 14 and 16 respectively. Sensors 48 and 50 detect the leading edge of copy sheet 70 as it is driven past the sensors. The sequence of engagement of the sensors 48 and 50 and the amount of time between each detection is utilized to generate control signals for correcting skew (rotational mispositioning of the sheet about an axis perpendicular to the sheet) of the sheet by variation in the speed of the drive rolls 14 and 16. The amount of time it takes for the leading edge of copy sheet 70 to arrive at one or both sensors 48 and 50 is used to generate control signals to the motors 18 and 20 which control the speeds of the drive rolls 14 and 16 in order to provide for longitudinal registration.

Thus, ideally the leading edge of copy sheet 70 will pass simultaneously over sensors 48 and 50. The electronic drive roll system will be used to adjust the location of copy sheet 70 in the skew and/or longitudinal direction if one or more sensors determines that it has become mis-aligned. For example, if sensor 48 is covered and sensor 50 is uncovered, copy sheet 70 is skewed and needs to be turned in the counterclockwise direction in order to achieve perfect registration. Counterclockwise rotation is achieved by moving motor 20 at a fast speed relative to that of motor 18. The change in velocity of motors 18 and 20 required to provide proper longitudinal positioning of copy sheet 70 is determined by the time at which the lead edge of the sheet is detected by sensor 48 and/or sensor 50.

Still referring to FIG. 4, top or lateral edge sensor 52 is suitably mounted on the frame of the equipment on which the registration system is mounted. Sensor 52 is arranged to detect the top edge of the sheet and the output therefrom is used to control transverse drive motor 40. The basic logic of operation provides that, if the sensor 52 is covered by the sheet, the motor 40 will be controlled to move the carriage to the left. If, on the other hand, one of the sensors 48, 50 indicates the presence of the leading edge of the sheet, and if sensor 52 remains uncovered, then the motor 40 is driven to move the carriage 12 to the right. In the preferred arrangement, the carriage is driven past the transition point, at which the lateral edge of the sheet is detected by the change of state of the sensor 52. Then the drive is reversed to position the lateral edge at the transition point.

Figure 5:
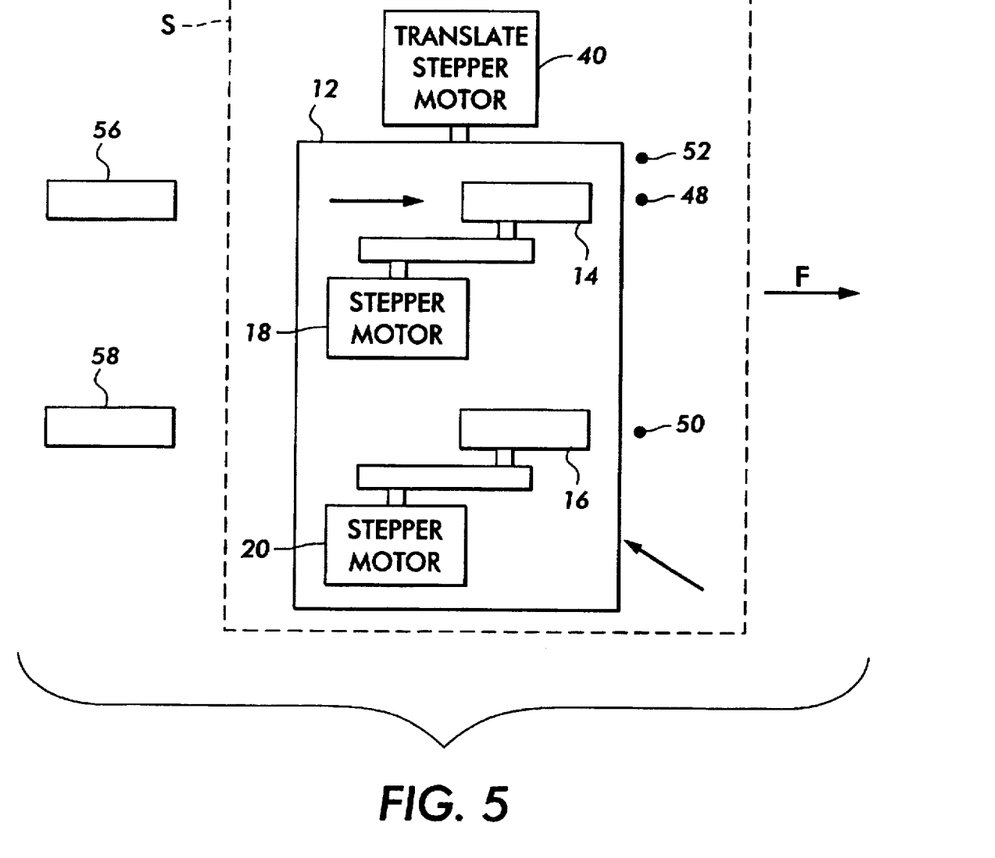
FIG. 5 is a schematic illustration of the translating electronic registration system shown in FIGS. 3 and 4, with the relative positions of the optical sensors indicated thereon.

FIG. 5 is a schematic illustration of a top view of a TELER electronic drive roll system which shows the positioning of the sensors. Although the foregoing description has been in the context of a registration system having two separately and independently driveable motors 18 and 20 for the drive rolls 14 and 16, it is possible to obtain skew correction with this design by the use of a single speed controllable drive roller used in conjunction with a drive roll driven at a constant speed. For example, the drive roll 14 could be driven through a suitable drive transmission, such as a belt or gear train from the main drive motor of a copier, at a constant speed. Skew correction can be achieved by varying the speed of the second drive roll with respect to the constant velocity drive roll. The advantages of quick skew correction and lateral edge correction are maintained, while the cost of the unit can be reduced by elimination of one of the variable speed drives.

An electronic drive roll system such as the TELER system previously described is very useful in aligning copy sheets for successful transfer of a developed image. However, these systems exhibit inaccuracies due to several factors, most notably variations in paper velocity which are caused by deformations in drive rolls 14, 16. These deformations and the resultant velocity variations are due to a variety of reasons, including normal forces that are exerted at the top of nips 80, paper drag, material properties of the drive and idler rolls themselves, ordinary roll wear, and numerous other circumstances. The problem is enhanced through the use of copy media having different weights and sizes. For example, copy sheets made from heavier bond place heavier loads on the drive rolls thereby resulting in the velocity variations previously discussed.

In addition, paper and other media manufacturing processes are imperfect, and as a result, the media which moves through nip 80 is typically asymmetrical. These less than perfect media shapes cause the need for providing registration alignment relative to a specified copy media edge.

It is therefore advantageous to provide an adaptive electronic registration device to provide continuous feedback about the error measured during operation of the electronic drive roll system and the adjustments that are being made to correct such errors. Feedback from copies made earlier during the cycle can be used to adjust the parameters used to make subsequent copies. Thus the problems arising from the above mentioned conditions can be overcome, and accurate and successful copy sheet registration can be maintained.

Referring back to FIG. 2, the position of photoreceptor 66 with respect to development station 82, and transfer station 84, is continuously tracked using an encoder 90. Encoder 90 is used to divide the path of motion of photoreceptor 66 into incremental positions, referred to as "machine clocks." In other words, one machine clock represents a specific amount of displacement of photoreceptor 66.

The first step in the use of an adaptive registration system is to determine the ideal number of machine clocks that elapse between the time light exposure of the original takes place, known as "flash" until the exact instant that the trailing edge of copy sheet 70 reaches point E, a predetermined location relative to the electronic drive roll system present within the copy machine. With continued reference to the TELER system already described, point E will be located just past the TELER sensors, which track each of the two measured directions of skew and longitudinal registration. When the ideal number of machine clocks elapses for both directions, perfect skew and longitudinal copy registration will be achieved. To determine the value of these ideal machine clock measurements, a technician will simply make copies and look at them to determine whether the system is operating such that a perfect registration will take place. If a less than perfect copy has been reproduced, the technician will adjust one or more numerical parameters which will alter the appropriate direction(s) of motion of copy sheet 70 through paper path 78. In each case, adjustment of the appropriate parameter will change the speed of the motors in the appropriate directions.

Figure 6:
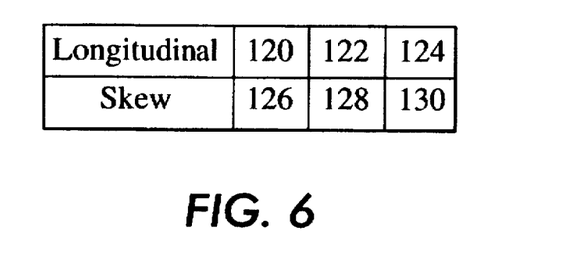
FIG. 6 illustrates a set of registers for storing motion control information obtained by the electronic registration system.

Referring now to FIG. 6, one example of the set up procedure that may be used to enable the adaptive electronic registration system will now be described. When the copy machine arrives at its designated location, identical machine clock values will be stored in the microprocessor in registers such as those depicted as locations 120–130. Referring back to FIG. 2, these stored machine clock values will equal the number of machine clocks that it actually takes for the trailing edge of latent image 68 to reach point F, the point at which the trail edge of copy sheet 70 should contact photoreceptor 66 after flash has occurred. The technician will make a copy and look at it to determine whether or not a perfect registration has taken place. Referring again to FIG. 6, if the copy is not perfect, the technician will alter one or more of the machine clock values stored in registers 120–130 to adjust the algorithms which control the motion of copy sheet 70. Registers 120–124 are reserved for values which control longitudinal correction, while registers 126–130 are reserved for skew correction data.

Once the machine is set up, adaptive registration will automatically compensate for variations in registration accuracy by measuring the number of machine clocks that elapse before the trailing edge of each copy sheet reaches the sensors after flash has occurred.

Figure 7:
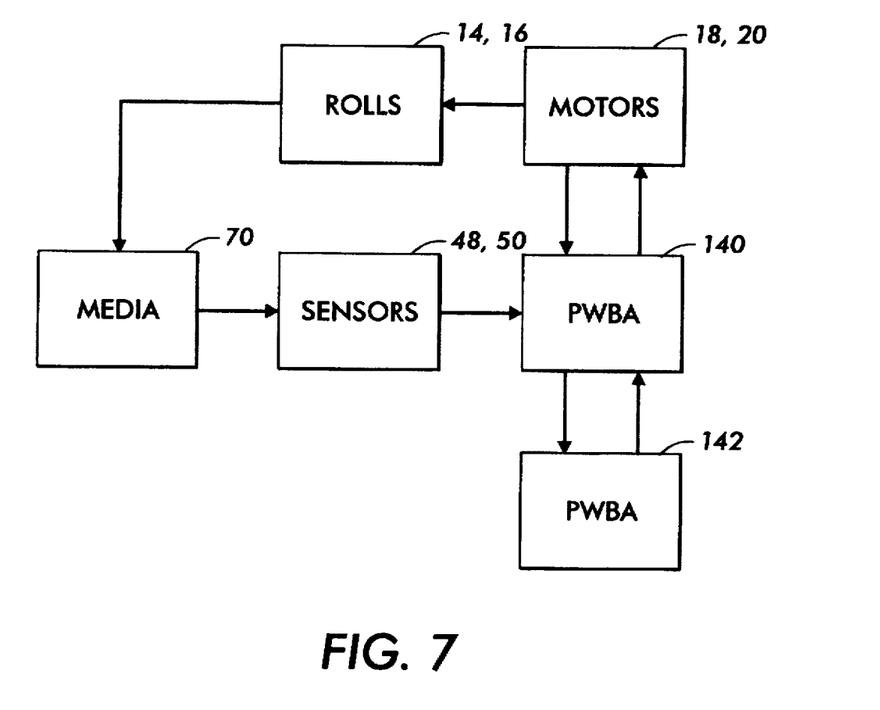
FIG. 7 is a block diagram depicting one electronic controller arrangement that can be used by the adaptive electronic registration system for communication between the drive rolls and the motion control system.

Referring now to FIG. 7, one embodiment of the present invention requires the values stored in the registers 120–130 to be transmitted via Printed Wire Board Assembly (PWBA) 140, the controller/driver for the registration motors, to PWBA 142, the printer controller for the main copier. In the embodiment shown, registers 120–130 reside on PWBA 142.

The PWBA 142 will maintain a running average of each set of three registers (one set of three for longitudinal registration and a second set of three registers for skew correction). For each copy cycle, the PWBA 142 will send the values for the current running averages (one for longitudinal direction and one for skew) to PWBA 140 where they will be used by PWBA 140 to adjust the algorithms which will control longitudinal and skew motions of the copy sheets following first copy sheet 70. It should be apparent that these averages will continuously migrate or home in on the ideal values stored in the six registers during set up.

When the first copy is made, an actual measurement of the correction required to properly register the first sheet will be taken. The information which describes the registration correction for this first sheet will be separated such that one algorithm can be used to describe longitudinal direction correction and another algorithm can be used to describe skew direction correction. Referring back to FIG. 6, the data in registers 120–124, and in registers 126–130 will be shifted to the left, such that the data in registers 120 and 126 will be erased, and registers 124 and 130 will be empty. The measured values of longitudinal and skew correction for the first sheet will then be stored in registers 124 and 130 respectively.

With continued reference to FIG. 7, longitudinal correction data to be stored in registers 120–124 on PWBA 142, and skew correction data to be stored in registers 126–130 on PWBA 142 will again be separately transmitted via PWBA 140 to printed wire board assembly (PWBA) 142. PWBA 142 will calculate an average of the three values stored in memory for correction of each direction. These average values will then be used by PWBA 140 to create motion control algorithms for a second copy sheet 70.

The process described above will be repeated throughout the copying operation. That is, as another copy is made, the data in registers 120–130 will be shifted one place to the left. Motion control algorithms of copy sheet 70 for skew and longitudinal registration will be adjusted or optimized using the values stored in registers 124 through 130 before contact of the sheet with photoreceptor 66.

Use of an INTEL 8085 CPU for PWBA 142 and an INTEL 8196 CPU for PWBA 140 would be acceptable for use with the present invention, but numerous other microprocessors may be used successfully, and the invention is not limited to this embodiment. The described embodiment of the present invention also shows the microprocessor and the motion control circuitry packaged on two printed circuit boards. This is also not required, and the microprocessor and other type of motion control specific circuitry can all be placed on a single board if such a configuration is desired. In any event, the new averaged ideal machine clock values will be used to control the motion of the next copy sheet 70.

Since the errors introduced through TELER nip deformations are a function of paper weights and sizes, and each of the paper supply drawers 76 can have a different type and size of paper, a separate set of registers 120–130 must be dedicated to each paper supply drawer 76 for storage of adaptive registration parameters. This minimizes the process of optimizing the number of machine clocks when a copy machine operator switches paper supply drawers.

As illustrated above, the present invention maintains a running average of the registration parameters used for the last three copy sheets 70. Information for more or fewer than three copies may be maintained as different systems are used. The appropriate number of sheets for which registration information should be maintained is best determined by studying the signal to noise character of the registration system. Information for more than three sheets should be maintained for a system having relatively low signal to noise ratio. As subsequent copies are made, correction data for each of the three preceding sheets will be used to provide more accurate correction parameters for the sheet currently being processed. Data of the sheet currently being processed will be measured and maintained in storage for controlling motion of subsequent sheets. Thus, the adaptive electronic registration system is able to continuously compensate for dynamic changes that take place during machine operation.

What is claimed is:

1. A method of continuously positioning copy media in a feed path, comprising the steps of:
 a) feeding the copy media into the feed path;
 b) using an ideal motion control parameter derived from a desired photoreceptor displacement to correct an orientation of the copy media for placement on a target in a pre-determined configuration;
 c) collecting data, in terms of a longitudinal component and a skew component, which describes a correction required to place the copy media in said pre-determined configuration;
 d) transmitting said data to a central processing controller, and storing it in locations in a computer memory;
 e) separately calculating average values for longitudinal and skew correction data from values stored in a plurality of computer memory locations;
 f) continuously updating said motion control parameter with said longitudinal and skew correction averages; and g) positioning subsequent copy media using said altered motion control parameter.

2. A method as described in claim 1 wherein said using step further comprises:
   a) comparing an actual motion control parameter with said ideal motion control parameter; and
   b) varying a speed of at least one copy media positioning device when said ideal motion parameter is not substantially equal to said actual motion parameter, thereby altering the copy media orientation.

3. A method as described in claim 2 wherein said varying step further comprises changing a speed of one or more registration motors communicating with the copy media.

4. A method as described in claim 1 wherein said collecting step further comprises determining motion profiles from said varying step.

5. A method as described in claim 1 wherein said locations in said transmitting step are registers in a computer memory.

6. An apparatus for continuously positioning copy media in a feed path, comprising:
   a) a paper tray for storing the copy media, and for advancing the copy media to the feed path;
   b) an electronic drive roll system defining a nip, said electronic drive roll system located at an end of the feed path to orient sheets for proper placement onto a target;
   c) a correcting device communicating with said electronic drive roll system and with a photoreceptor displacement measuring device to adjust an orientation of the copy media based upon a desired photoreceptor displacement, if said copy media has become misaligned;
   d) a measuring device to determine a profile which includes a motion that has been required to eliminate misalignment of at least a first copy media;
   e) a feedback system communicating with said electronic drive roll system and with said correcting device to alter, based upon said profile, an orientation of subsequent copy media as it enters said nip, thereby reducing an amount of misalignment present when said subsequent copy media exits said nip; and
   f) a media transport system to move the copy media from said paper tray, along the feed path, to said electronic drive roll system, and to advance the copy media through said nip.

7. An apparatus as claimed in claim 6 wherein said electronic drive roll system is a translating electronic registration system.

8. An apparatus as described in claim 7 wherein said electronic drive roll system comprises:
   a) a plurality of sensors to detect an orientation of the copy media as it exits said nip, and to signal a control system when the copy media is misaligned within the feed path;
   b) a pair of axes, coaxially mounted across the feed path, each of said axes having a first and second end;
   c) a plurality of rolls rotatably mounted upon said axes, said rolls contactably mounted in pairs, each pair defining a nip, with at least one roll pair mounted at said first axis end, and at least one roll pair mounted at said second axis end; and
   d) a plurality of motors, one motor communicating with each of said roll pairs, to separately cause rotation of said roll pairs about said axis.

9. An apparatus as described in claim 8 wherein said sensors are optical sensors.

10. An apparatus as described in claim 8 wherein said motors are step motors.

11. An apparatus as described in claim 8 wherein said correcting device further comprises:
    a) means for reading a misalignment signal from said sensors;
    b) means for sending a control signal to vary said speed of one or more motors.

12. An apparatus as described in claim 8 wherein said feedback system further comprises:
    a) a receiver which accepts motion signals from said motors;
    b) an input transmitter which sends said motion signals from said receiver to a controller;
    c) a processing station, within said controller, which determines the amount of correction required to prevent misalignment of copy media and transforms it to correction signals; and
    d) an output transmitter which returns said correction signals to said motors.

13. An apparatus for continuously positioning copy media in a feed path, comprising:
    a) means for feeding the copy media into the feed path;
    b) means for correcting an orientation of the copy media for placement on a target in a pre-determined configuration;
    c) means for collecting data, in terms of a longitudinal component and a skew component, which describes a correction required to place the copy media in said pre-determined configuration;
    d) means for transmitting said data to a processing controller, and storing it in a computer memory;
    e) means for separately calculating average values for longitudinal and skew correction data from values stored in computer memory;
    f) means for continuously updating said correcting means with said longitudinal and skew correction averages; and
    g) means for positioning subsequent copy media using said altered correction means.

14. An apparatus as claimed in claim 13 wherein said correcting means further comprises:
    a) means for comparing actual motion control with said ideal motion control parameter; and
    b) means for varying a speed of at least one copy media positioning device when said ideal motion parameter is not substantially equal to said actual motion parameter, thereby altering the copy media orientation.

15. An apparatus as claimed in claim 14 wherein said varying means further comprises means for changing a speed of one or more registration motors communicating with the copy media.

16. An apparatus as claimed in claim 13 wherein said collecting means further comprises means for describing motion output from said varying step.

17. An apparatus as claimed in claim 13 wherein said locations in said transmitting means are registers in a computer memory.

* * * * *